United States Patent [19]
Dent

[11] 4,183,694
[45] Jan. 15, 1980

[54] COMBINATION TUBE FIXED TO A SHANK OR NIPPLE

[76] Inventor: Robert K. Dent, 17765 Beach Dr., NE., Seattle, Wash. 98155

[21] Appl. No.: 908,404

[22] Filed: May 22, 1978

Related U.S. Application Data

[62] Division of Ser. No. 714,600, Aug. 16, 1976, Pat. No. 4,114,250.

[51] Int. Cl.² ............................................. F16B 29/00
[52] U.S. Cl. .................................... 403/320; 403/343
[58] Field of Search ............... 403/320, 343; 151/2 A, 151/14.5, 14 DW

[56] References Cited

U.S. PATENT DOCUMENTS

| | | | |
|---|---|---|---|
| 646,898 | 4/1900 | Deiters | 151/14.5 |
| 1,134,666 | 4/1915 | Blocher | 151/14.5 |
| 1,154,691 | 9/1915 | Carpenter | 151/14 R |
| 1,185,772 | 6/1916 | Collier | 151/14.5 |
| 2,250,495 | 7/1941 | Miller | 403/343 |

*Primary Examiner*—Andrew V. Kundrat

[57] ABSTRACT

There is disclosed an externally threaded shank, such as that of a bearing or clevis or eyebolt, or an externally threaded nipple, such as that of a tubular insert, fixedly and nonrotatably secured to and disposed within the internally threaded bore of a tube. In connection with shanks, longitudinal slots are provided therein. In connection with nipples, an end flange or shoulder with notches therein is provided. In connection with tube end portions, to receive either a shank or nipple, notches are provided in an end wall thereof. Then a sleeve, preferably of like but softer material than the tube and of larger diameter than the tube, is disposed on the shank or on the nipple and adjacent the notches or slots in the tube end portion. The sleeve selectively employs either a smooth bore, an internally threaded bore, lugs on either end wall thereof, or an internal spline, or combinations of less than all thereof. Then the sleeve is cold pressed providing metallic flow and migration of metal into the threads of the shank adjacent the tube end wall and into the longitudinal slot in the shank, if a shank is employed; or into the threads adjacent the tube end wall, into the nipple notches, and into the notches in the tube end wall, if a nipple is employed. A shank or a nipple thus nondetachably secured to a tube is the product of this invention.

9 Claims, 14 Drawing Figures

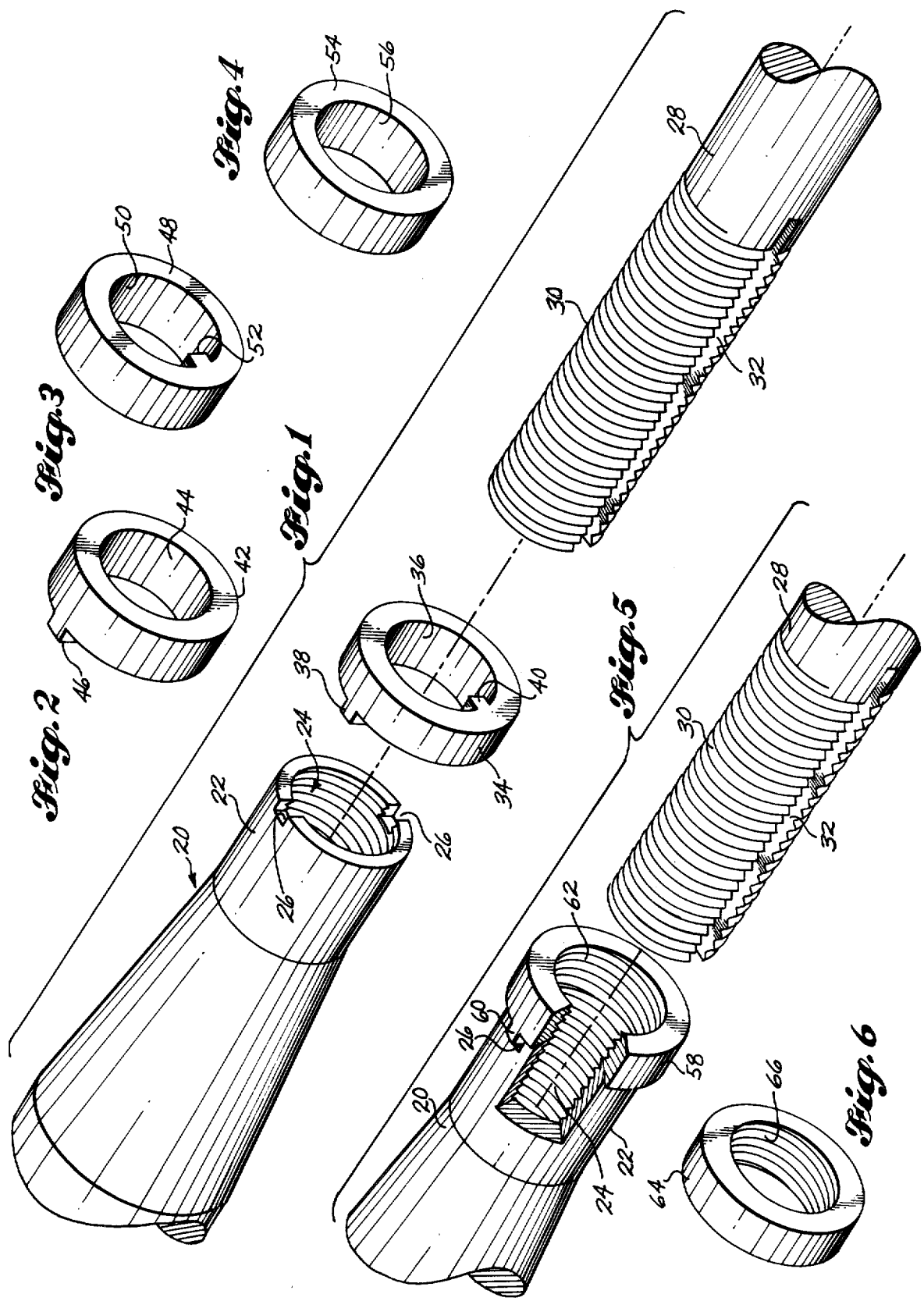

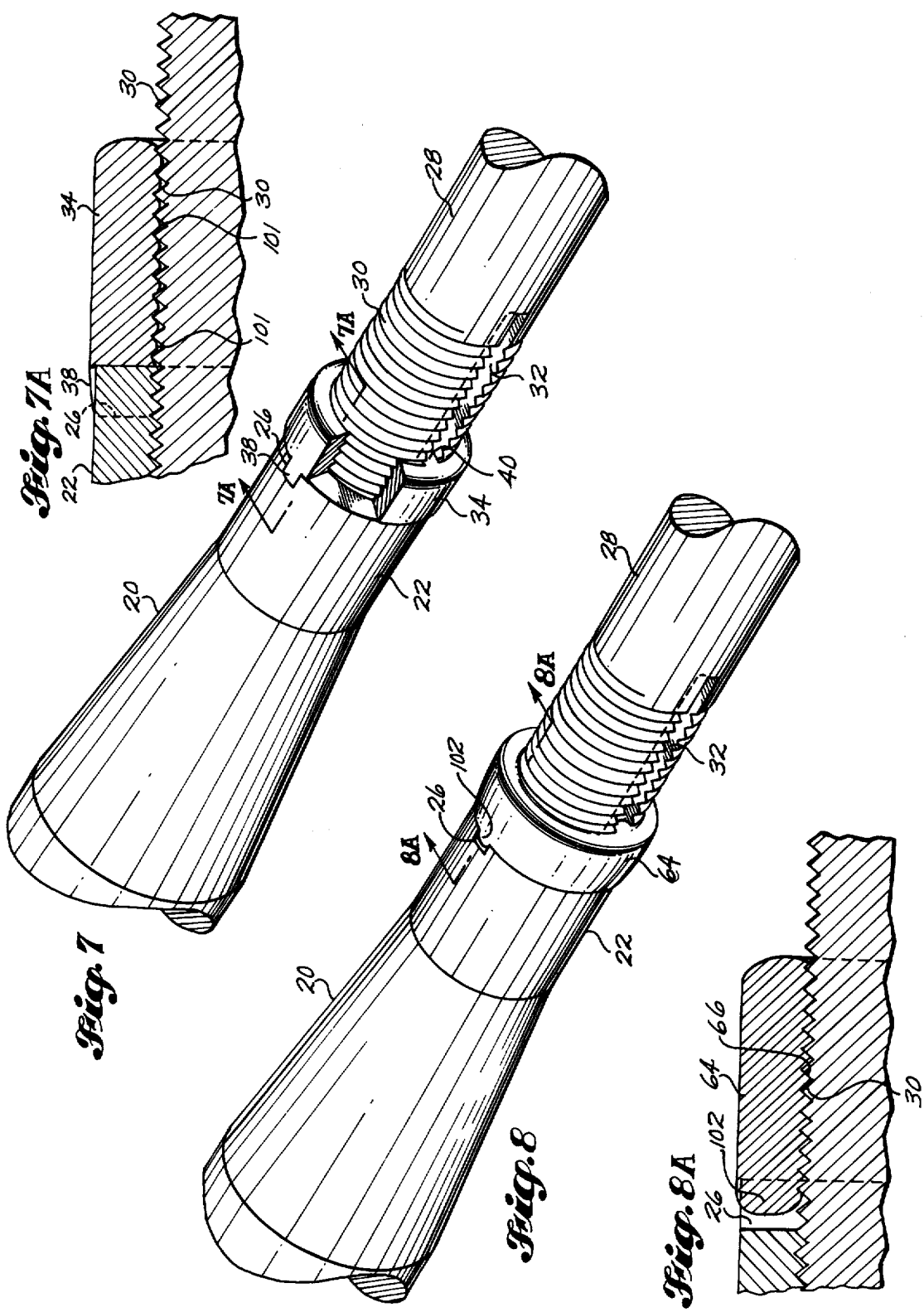

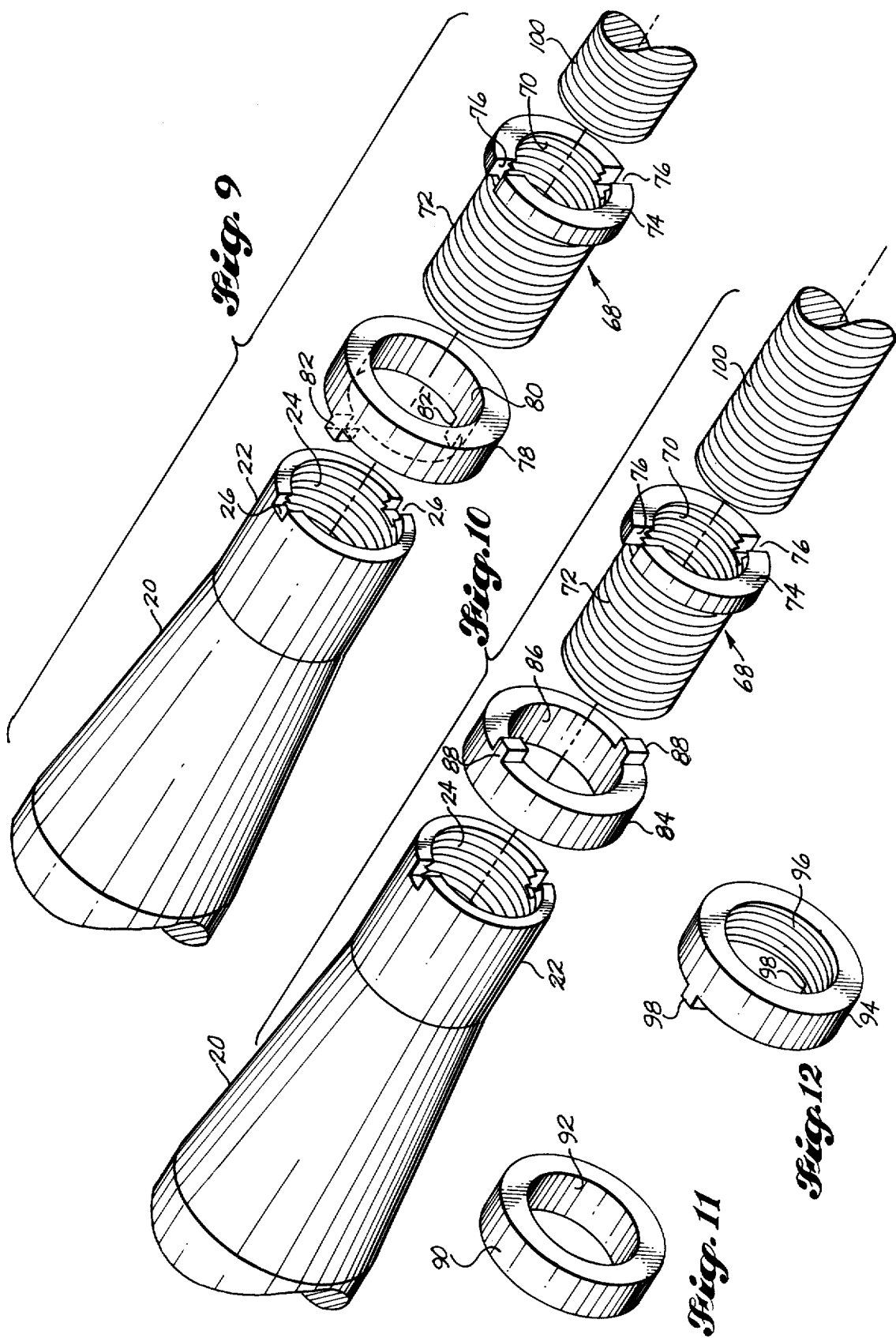

COMBINATION TUBE FIXED TO A SHANK OR NIPPLE

CROSS REFERENCE TO RELATE APPLICATIONS

The present invention is a divisional application of my copending U.S. application, Ser. No. 714,600, filed 8/16/76 now U.S. Pat. No. 4,114,250.

Other pertinent prior art, located during the pendency of my said parent application of which this is a divisional application is:

| U. S. PATENT DOCUMENTS | | | | |
|---|---|---|---|---|
| U.S. Pat. No. | DATE | NAME | CLASS | SUB-CLASS |
| 971,794 | 10/1910 | Scott | 29 | 517ux-R |
| 1,154,691 | 9/1915 | Carpenter | 151 | 14R |
| 1,643,484 | 9/1927 | Beckfield | 151 | 14.5 |
| 1,660,455 | 2/1928 | Plumb | 403 | 274 |
| 2,001,290 | 5/1935 | Thomson | 151 | 14.5x-R |
| 2,250,495 | 7/1941 | Miller | 403 | 343 |
| 2,441,580 | 5/1948 | Mazesch | 29 | 517ux-R |
| 2,969,996 | 1/1961 | White | 403 | 274 |
| 3,652,111 | 3/1972 | Dent | 285 | 382 |
| 3,722,076 | 3/1973 | Dent | 29 | 517 |

BACKGROUND OF THE INVENTION

One way of nondetachably securing a tube to the shank portion of a nipple or insert is disclosed in my prior U.S. Pat. No. 3,652,111. In this patent a steel nipple or insert is non-detachably connected within the bore of an aluminum tube. A reason for employing such a steel nipple is the belief that such is necessary in the airplane art, where an aluminum tube is adjustably connected to a steel shank and where repeated adjustments thereof are required. In general, this patent teaches the cold pressing of external grooves and crests on inserts; next, a tube with a bore is positioned over the insert, and then the tube is cold pressed and by metallic flow, the internal bore of the tube mates the external pattern of grooves and crests on the shank of the insert, thus, nondetachably interconnecting the tube and the nipple or insert.

Another prior art way of rigidly securing a shank portion of a clevis, bearing, or eyebolt to a tube was to provide serrations or indentations on the end wall of the tube, providing adjustable mechanical locking means with serrations carried by the shanks, mating the serrations or locking means on the shank with those carried by the tube, providing nut locking means threaded on the shank to move the two serrated members into locking engagement, and then by wire locking means preventing the loosening of the nut means.

A third way was to use a resin binder, to bond the external threads on a shank to the internal ones of the tube.

SUMMARY OF THE INVENTION

An externally threaded shank, such as that of a bearing, clevis, or eyebolt, is provided with a longitudinally extending slot. Also, an internally threaded tube is provided having an end wall with notches or slots therein, or, a nipple having an end flange or shoulder with notches or slots in said end flange. The shank or nipple is threadedly connected with the tube, with a sleeve disposed on the shank or nipple and adjacent the end portion of the tube in which the notches or slots are disposed. The sleeve is preferably of a larger diameter than the adjacent portion of the tube and is preferably of like, but softer, material than that of the tube. The sleeve selectively employs one or more of the following features: it is internally threaded and mates the external threads of the shank or nipple with which it is used; it has a smooth, internal bore; lugs matching the notches or slots in the end wall of the tube, or in the end flange or shoulder of the nipple are provided in a selected end wall thereof; plain surfaces are provided on an end wall or end walls thereof; and a radially, inwardly projecting spline, matching the longitudinal slots in the shank is provided.

After such a shank or nipple, tube and sleeve are assembled with the sleeve adjacent the end wall of the tube having the notches or slots therein, the sleeve is cold pressed causing a metallic flow. If lugs are employed on the sleeve matching notches or slots in the end wall of the tube or in a flange or shoulder of the nipple, or if a radially extending spline is provided on the sleeve matching the longitudinally extending slots in the shank, then the flow will tighten the contact between the parts providing an extremely snug fit therebetween. If a sleeve without lugs is provided, then there will be a metallic flow, upon swaging, into the notches or slots in the shoulder of the nipple or those in the end wall of the tube. Also, there will be a flow of metal between the bore of the sleeve and the threads of the shank or the threads of the nipple on which the sleeve is disposed, and this, regardless of whether the sleeve was, or was not, initially internally threaded.

The invention includes the product of the process of rigidly securing a tube to a shank or a nipple.

Other objects, advantages, and details of this invention will become implicit and explicit as the description of this invention proceeds in connection with the drawings, wherein an exemplification of the method and product thereof is illustrated and described and which invention, is capable of expression in other forms than those expressly illustrated and described.

DESCRIPTION OF THE DRAWINGS

FIG. 1 is an exploded, perspective view, with parts broken away, showing fragments of a tube and shank and a form of sleeve which may be used therewith, such sleeve including features, such as a smooth bore, lugs on one end wall thereof, and a radially, inwardly projecting spline;

FIGS. 2, 3, and 4 are perspective views of modified forms of sleeves, all with smooth bores, which may be used with the tube and shank of FIG. 1 of the drawings;

FIG. 5 is an exploded, perspective view, similar to FIG. 1, and showing the combination of FIG. 1 except as to the sleeve—the latter being shown with a threaded bore and lugs in an end wall thereof;

FIG. 6 is a perspective view of a modified form of internally threaded sleeve, which may be used with the tube and shank of FIG. 1 or 5;

FIG. 7 is a perspective view, with parts broken away, illustrating the tube, shank, and sleeve after swaging or cold pressing of the sleeve and with the sleeve having the lugs and spline shown in FIG. 1 employed;

FIG. 7A is a fragmentary sectional view taken substantially on broken line 7A—7A of FIG. 7;

FIG. 8 is a view similar to FIG. 7 but the sleeve, prior to swaging, had the form shown in FIG. 6 of the drawings;

FIG. 8A is a fragmentary sectional view taken substantially on broken line 8A—8A of FIG. 8;

FIG. 9 is an exploded, perspective view, with parts broken away, showing a fragment of a tube, a nipple, and one form of sleeve, the latter having a smooth internal bore and with lugs projecting from one face of the sleeve and mating the notches in the end wall of the tube;

FIG. 10 is a perspective view of a modified form of sleeve, and having lugs mating the notches in the flange of the nipple;

FIG. 11 is a perspective view of another modified form of sleeve and shows the sleeve having a smooth bore and no projecting lugs; and FIG. 12 is a view of a modified form of sleeve having an internally threaded bore and having lugs on one face thereof mating the notches in the end wall of the tube.

DETAILED DISCLOSURE

A tube 20 has the desired diameter and length for the purposes intended. Such tubes, when used in the airplane and in push-pull operative condition, are formed of aluminum, and have reduced, opposite end portions 22 (only one being shown) and each thereof is provided with an internally threaded bore 24. A plurality of end notches 26 are disposed in the end wall of tube end portion 22 and the side walls of such notches preferably extend parallel to the axis of the bore 24. An example of a metal suitable for fabrication of the tube 20 is 2024T42 aluminum alloy.

A terminal end portion of the shank 28 is broken away and such end portion generally consists of a bearing, or clevis, or eyebolt so that the tube 20 and parts connected therewith can function in a push-pull construction. The shank 28 is of conventional material, such as steel. The shank 28 is provided with external threads 30 which mate with the internal threads 24 of the tube 20. Also, the shank 28 is provided with a conventional, longitudinally extending slot 32.

It is desired that the swaging action shall be isolated from adjacent parts, such as tube end portion 22. A preferred way of causing such isolation is to provide a sleeve, as 34, of greater diameter than that of tube end portion 22. Thus, the swaging tool will contact such sleeve but will not provide any substantial pressure on the reduced end portion 22 of the tube 20 and will thus not cause metallic flow of the tube but will cause metallic flow of the sleeve employed, such as the sleeve 34. This is true of the other sleeves illustrated and described herein. Also, the sleeve is preferably fabricated from metal which is like, but softer than the tube 20, such as 6061-T4 aluminum alloy. The foregoing sleeve characteristics as to diameter and preferable softness characterize all of the sleeves employed herein.

The said sleeve 34 is also characterized by having a smooth internal bore 36, and a pair of lugs 38 which somewhat loosely mate the notches 26 in the end wall of the tube 20. Also, an internal spline 40 is carried by sleeve 34 and extends radially inwardly and loosely mates the longitudinally extending slot 32 in the shank 28.

To assemble the construction of FIG. 1, the sleeve 34 is first slid onto the shank 28. The sleeve 34 has a smooth bore and a diameter sufficiently large to permit such sliding movement. Then the threaded shank 28 is threaded into the internally threaded tube 20 with sufficient threads 30 engaging the desired amount of internal threads 24. Then the shank 28 is relatively turned until the lugs 38 align with and are caused to enter the notches 26 in the end wall of the tube 20 and the advancing end wall of sleeve 34 is caused to abut an end wall of tube 20. Later, the sleeve 34 is cold pressed or swaged and this will be considered in connection with the swaging of the various sleeves herein disclosed.

The sleeve 42 of FIG. 2 has a smooth internal bore 44 and a pair of lugs 46, the latter which, preferably, loosely mate with the notches 26 in the tube 20. However, there is no internal spline associated with the sleeve 42 and thus the sleeve 42 may be slid onto the threaded shank 28, the shank threadedly engaged with the internal threads 24 of the tube 20 and at any time the sleeve 42 may be rotated the desired amount and slid until the lugs 46 enter into the notches 26 in the end wall of the tube 20 and the advancing end wall of sleeve 42 abutted against an end wall of tube 20.

The sleeve 48 of FIG. 3 has a smooth internal bore 50 and an internal spline 52. To employ such a sleeve, the same is slid onto the shank 28 with the spline 52 sliding in the longitudinal slot 32 in the shank 28. Thereafter, the shank 28 with the sleeve 52 nonrotatable thereon are both turned together until the shank 28 is threaded the desired extent into the tube 20 on internal threads 24 thereof. Then, the sleeve 48 is abutted against the end wall of the tube 20 for later swaging.

The sleeve 54 of FIG. 4 is a plain band with a smooth internal bore 56. There are no lugs and no internal spline. The sleeve is assembled similar to that of FIG. 2 with the exception that there are no lugs to interfit with the notches 26 in the end wall 22 of the tube 20.

The main difference between the sleeves of FIGS. 5 and 6 and those of FIGS. 1 to 4, inclusive, is that those of FIGS. 5 and 6, both have internal threads mating, loosely, the threads 30 of the shank 28. In FIG. 5, the same parts shown in FIG. 1 are given the same numbers, namely, tube 20, reduced end portion 22, internal threads 24, notches 26 in the end wall of tube 20, shank 28, external threads 30, and longitudinal slot 32 in shank 28. The sleeve 58 is provided with lugs 60 thereof loosely mating notches 26 in the end wall of tube 20 and such sleeve has an internally threaded bore 62. There is no internal spline on the sleeve 58. The thread construction of internal threads 62 of sleeve 58 and internal threads 24 of tube 20 is such that the lugs 60 of sleeve 58 may be first inserted into the notches 26 in the end wall of tube 20 and then the external threads 30 of the shank 28 can be fed continuously, first through the sleeve 58 and then into the threads 24 of the tube 20. When the shank 28 is threaded into the sleeve 58 and tube 20 the desired amount, then the sleeve 58 is ready for subsequent swaging.

The sleeve 64 of FIG. 6 is provided with internal threads 66 which loosely fit on the external threads 30 of the shank 28. The sleeve 64 has no lugs and no spline and may be threaded onto the externally threaded shank 28 to a desired extent. Thereafter, the shank 28 may be threaded into the internal threads 24 of the tube 20 with the shank extended into the tube the desired amount. Then the sleeve 64 can be turned to abut against the end wall of the tube 20. When the sleeve 64 is jammed against a tube 20, the lost motion, from clearance between the external threads 30 on a shank 28 and the internal threads 24 of a tube 20, is removed. Thus, sleeve 64 can be installed as a jam nut, before swaging and with swaging, there will be a better flow of material into the slot 32 and into the notches 26. Also, of course, the sleeve 64 of FIG. 6 can be assembled in the same manner as indicated in connection with FIG. 5 so that the sleeve 64 is abutted against an end wall of tube 20 and then the threaded shank 28 is simultaneously threaded through both the sleeve 64 and the tube 20.

Now referring to FIGS. 9 to 12, the tube 20, reduced end portion 22 thereof, internally threaded bore 24, and the notches 26 may be of the same construction as the parts described in connection with FIG. 1 and therefore such parts are given like numbers in said FIGS. 9 to 12.

In FIG. 9, such a tube 20 is to be connected with a nipple 68 rather than the shank 28 of the previous figures. The nipple 68 has an internally threaded bore 70, an externally threaded shank 72, a flange 74, and notches 76 in the flange 74. The internally threaded bore 70 threadedly receives an appropriately externally threaded shank 100 which may be inserted during swaging and may be later removed. Also, during use a similar shank, having desired end features as a bearing, clevis, or eyebolt, will be threaded into internally threaded bore 70. Also, the nipple 68 may be solid, as distinguished, from having an internally threaded bore, and after swaging, the nipple 68 may be provided by an internally threaded bore.

The sleeve 78 of FIG. 9 has as smooth bore 80 and lugs 82 on one end wall thereof. The lugs 82 are of a size to loosely interfit with the notches 26 in the end wall of the tube 20. The bore 80 is of a size to slide over the external threads 72 of the nipple 68. Also, the sleeve 78, like all the sleeves hereof, is preferably of softer material in relation to that of the tube 20 and is of a larger external diameter than the adjacent end portion of the tube 20 and the flange 74 to somewhat isolate the swaging to the sleeve.

The sleeve 78 of FIG. 9 is abutted against the end wall of the tube 20, with the lugs 82 in the notches 26 in the end wall of the tube 20, and then the external threads 72 of nipple 68 are screwed into the internal threads 24 of the tube 20 until the flange 74 firmly engages the sleeve 78 and urges it against the end portion 22 of tube 20. Also, the sleeve 78 may be slid over the threads 72 of the nipple 68, nipple 68 threaded into internal threads 24 and just before the flange 74 engages one wall of the sleeve 78, the lugs 82 are disposed in the notches 26 and then the nipple tightened to provide the same position of the sleeve 78 with its end walls abutting the end wall of the tube 20 and the inner wall of the nipple flange 74. The sleeve 78 is now positioned for subsequent swaging.

The sleeve 84 of FIG. 10 has a smooth internal bore 86 and has lugs 88 which loosely fit into the notches 76 of the nipple 68. To install sleeve 84, the sleeve is slid over the external threads 72 of the nipple 68 and adjusted until the lugs 88 of the sleeve 84 loosely fit into the notches 76 in flange 74. Then the nipple 68 and the sleeve 84 are turned together and the threads 72 of the nipple 68 are threaded into the threads 24 of the tube 20 until the sleeve 84 has one wall abutting against the end wall of the tube 20 and its other end wall abutted against the inner wall of the flange 74. The sleeve 84 is now positioned for subsequent swaging.

The sleeve 90 of FIG. 11 has a smooth bore 92 and is without lugs on either end wall thereof. The sleeve 90 may be slid over the external threads 72 of the nipple 68 or abutted against the end wall of the tube 20 and then the external threads 72 of the nipple 68 are threaded into the internal threads of the tube 20 until the sleeve 90 has one wall abutted against the end wall of the tube 20 and the other wall thereof abutted against the inner wall of the flange 74. The sleeve 90 is now positioned for subsequent swaging.

The sleeve 94 of FIG. 12 has an internally threaded bore 96 and lugs 98 of a size to loosely interfit with the notches 26 in the end wall of the tube 20. To install such sleeve 94, it is abutted against the end wall of the tube 20 with the lugs 98 disposed in the notches 26 in the end wall of tube 20. Thereafter, the externally threaded shank 72 of the nipple 68 is threaded into the threads 96 of sleeve 94 and into the internally threaded bore 24 of the tube 20 until the sleeve 94 has one wall thereof abutted against the end wall of the tube 20 and its other wall is abutted against the inner wall of the flange 74. The sleeve 94 is now positioned for subsequent swaging.

In the swaging of any of the sleeves shown and described herein, radially and inwardly directed pressure is applied on the periphery of a selected sleeve: while the shank 28 of FIGS. 1 to 6 is threadedly disposed in internally threaded bore 24 of tube 20, or while threaded shank 72 of nipple 68 is disposed in internally threaded bore 24 of tube 20 and while a threaded shank 100 of suitable diameter is threadedly disposed in the internal bore 70 of the nipple 68, and also while, a sleeve 34, 42, 48, 54, 58, or 64 is disposed on the shank 28 and with one wall of the sleeve abutting against the end wall of the tube 20. With adequate radial inward pressure on such a sleeve, there will be metal flow from the sleeve causing (see FIGS. 7 and 7A), as a result of the swaging, the lugs 38 from a sleeve (such as 34) to enlarge and precisely interfit with the notches 26 in the end wall of the tube 20. Also, the spline, such as the spline 40 of sleeve 34 of FIG. 1, will enlarge and precisely interfit, crosswise considered, with longitudinal slot 32 in shank 28. When a sleeve has a smooth bore, as smooth bore 36 of sleeve 34 in FIG. 1, then material adjacent said bore will flow into the threads of the threaded shank on which the sleeve is disposed, such as the threaded shank 28 of FIGS. 1 to 6, or the threaded shank 72 of the nipple 68 of FIGS. 9 to 12. Thus, in FIGS. 7 and 7A, such flow 101 of metal from a sleeve 34 into the threads 30 of a shank 28 is illustrated.

In FIGS. 8 and 8A, a swaging is illustrated of a sleeve having an internally threaded bore, as the sleeve 64 of FIG. 6. The sleeve 64 is preferably urged tighter or jammed against the end of sleeve 20. This will remove the slack between threads 30 and 66. Thus, after swaging, there is an extremely tight fit between the internal threads 66 of the sleeve 64 and the external threads 30 of the shank 28. When a sleeve has no lugs, such as sleeve 64 of FIG. 6, then the migration or flow of metal 102 from a sleeve is lengthwise and into notches in the end walls of a tube, such as notches 26, or notches in a flange of a nipple, such as notches 76 in the flange 74. While the flow of metal 102 may not be sufficient to completely fill the notches, as indicated in FIGS. 8 and 8A in connection with the notches 26 in the end wall of the tube 20, there still will be sufficient flow to affix the sleeve to the tube 20. The same will be true in connection with other sleeves not having lugs on end walls thereof and disposed adjacent end walls of a tube having notches, such as 26 therein, or disposed adjacent a flange of a nipple, such as flange 74 of nipple 68 having notches 76 therein.

After swaging of the various sleeves illustrated and described herein, the strongest lock will be between a sleeve and the threads 30 of shank 28 or between a sleeve and the threads 72 of nipple 68. To fortify such lock, when desired, a sleeve may be initially internally threaded, as threads 62 or 66 of FIGS. 5 and 6, or by the threads 96 of FIG. 12. When both the shank or nipple and a sleeve are initially threaded, the amount of metal flow required from the swaging operation to fix the sleeve to the shank or the sleeve to the nipple is less than would be required if both were not threaded and generally a final lock is stronger where less metal flow is required.

A relatively strong fixation or lock will result, after swaging, between any of the sleeves and the end wall of tube 20 having notches 26 therein. Similarly, such a fixation will result between a sleeve and a flange of a nipple, as nipple 68 having a flange 74 with notches 76 therein. The strength of the fixation has a relation to the amount of metal of the sleeve disposed in the notches. Thus, to increase such fixation, when desired, lugs are initially employed on the end portions of sleeves, such as lugs 38 (FIG. 1), lugs 46 (FIG. 2), lugs 60 (FIG. 5), lugs 82 (FIG. 9), and lugs 98 (FIG. 12). Again, less metal flow during swaging is required to fit such preformed lugs with notches than would be required if such preformed lugs were not used and thus, often a stronger fixation results by the use of such preformed lugs.

If still further increase in fixation is desired, the number of notches 26 in the end wall of tube 20 or the number of notches 76 in the flange 74 of nipple 68 may be increased, and with, or without, an increase in the number of matching lugs.

A relatively strong fixation will result, after swaging between the shank 28 and a sleeve, but this fixation again can be increased, when desired, by initially adding to the sleeve a radially inwardly projecting spline, such as 40 (FIG. 1) or 52 (FIG. 3).

Thus, added final fixation strength may obtain by selectively initially adding such features as lugs on a face of a sleeve to engage notches in the end wall of a tube or nipple, increasing the number of such lugs or notches, internally threading of the sleeve, or adding a radially inwardly projecting spline to a sleeve to match a slot in the shank. However, all of such features cannot be added in a single case as such would prevent initial installation of the sleeve, prior to swaging.

CONCLUSION

It will now be apparent that there is provided a product resulting from a process for rigidly connected a tube having an end wall and with an internally threaded bore, as 24, connected with an externally threaded shank 28 having external threads 30 which comprises providing slots or notches 26 in the end wall 22 of tube 20 and the providing of a longitudinally extending groove 32 in the shank 28. Next, a sleeve is provided having an external diameter greater than that of the tube portion 22 or that of flange 74, so that as swaging pressure is applied, the same can be isolated on the sleeve and will have little effect on the tube end portion 22 or on nipple 68, if a nipple is employed. Also, the sleeve has an internal diameter so that any of the sleeves disclosed can be either slid on or threadedly received on the shank 28 and the external threads 30 thereof. Next, the shank 28 is threaded into the internally threaded bore 24 of the tube 20 and with the sleeve on the shank 28 and abutting the end wall of tube 20. The final step is the cold pressing or swaging of the sleeve and providing for metal flow of the sleeve into the slots 26 in the end wall of the tube, into the slot 32 in the shank, and into the threads of the shank. With metal flow into the slots 26, later movement between the sleeve and tube 20 requires shearing of such flowed metal to permit relative movement between the tube and the sleeve.

More specifically, the side walls of the slot 26 are preferably parallel to the axis of the bore of the tube and thus tend to prevent separation of the sleeve from the tube when they are turned relative to each other.

One form of sleeve is provided with internal threads, such as internal threads 62 or 66 of FIGS. 5 and 6, which mate the external threads 30 of the shank 28.

A form of sleeve shows lugs 38 (FIG. 1), lugs 46 (FIG. 2), lugs 60 (FIG. 5), lugs 82 (FIG. 9), lugs 98 (FIG. 12) which are initially disposed in notches 26 in the end wall of tube 20. Another combination of the process for producing this product involves the use of a spline or tongue, as 40 (FIG. 1), 52 (FIG. 3), to initially engage a slot 32 in shank 28 which loosely fits upon installation and after cold pressing or swaging provides a tight fit between such a tongue or spline and the longitudinal slot of a shank.

The invention includes the end product wherein the swaged tube and shank, previously described, have been rigidly united after the swaging.

Next, there is described a process for joining together the tube 20 and the nipple 68, best shown in FIG. 9 of the drawings. In this process, the steps include the providing of the slots 26 in the end wall of the tube 20, providing the sleeve of a greater external diameter than that of the tube end 22 and also than that of flange 74, so that the cold pressing and swaging is somewhat isolated in its action to the sleeve. Then, the sleeve is provided with an internal diameter so that it will slidingly or threadingly pass over the threads 72 of the nipple 68. The nipple 68 is threaded with external threads 72 thereof, threadedly engaging the internal threads 24 of the tube 20. The sleeve is disposed between the flange 74 of the nipple 68 and the end wall of the tube 20. Then by cold pressing and swaging of the sleeve, there is metallic flow from the sleeve into the slots or notches 26 in the end wall of the tube 20 and into the notches or slots 76 in the flange 74 of the nipple 68.

Next, in connection with the tube and nipple of FIG. 9, the notches 26 are provided with side walls aligned with the axis of the bore of the tube 20 so that any shearing action by relative motion between the nipple and the tube will be against a wall disposed at right angles to the shearing force.

Next in the combination, there is provided slots 76 in the nipple 68 and the side walls of such slots 76 are aligned with the axis of the bore of the tube to again provide for a side wall at right angles to any shear force which would tend to unloosen the nipple 68 from the tube 20. Next, in connection with the sleeve to be employed in connection with the nipple 68, such sleeve is provided with initially projecting lugs, such as lugs 88 of FIG. 10, or are provided with projecting lugs 82 on the sleeve 78 matching the slots or notches 26 in the end wall of the tube 20. Also, in connection with sleeves employed in connection with the tube 20 and nipple 68 of FIG. 9, such sleeves may have an internally threaded bore, such as internally threaded bore 96 of FIG. 12.

Also, in connection with FIGS. 9 to 12, there is the combined swaged tube and nipple as the end product of the process in connection with such figures.

Obviously, changes may be made in the forms, dimensions, and arrangements of the parts of this invention without departing from the principle thereof, the above setting forth only preferred forms of embodiment of this invention.

I claim:

1. A combination swaged joined tube and an externally threaded steel member comprising an aluminum tube having an end wall having slots in said end wall, and having an internally threaded bore threadedly receiving therein an externally threaded steel member; and an aluminum sleeve being disposed on the externally threaded member and adjacent the end wall of the tube and being cold pressed to provide for flow of aluminum from said sleeve into the slots in the end wall of the tube, and into the internal threads of the bore of said tube and into the threads of said externally threaded member.

2. A combination swaged joined tube and shank comprising an aluminum tube having an end wall and having an internally threaded bore threadedly receiving therein an externally threaded steel shank and with a longitudinally extending groove in the shank and slots in the end wall of the tube; and an aluminum sleeve being disposed on the shank and adjacent the end wall of the tube and being cold pressed to provide flow of aluminum metal from said sleeve into the groove in the shank, into the slot in the end wall of the tube, and into the external threads of the shank.

3. The combination of claim 2, wherein the slots in the end wall of the tube are provided with side walls aligned with the axis of the bore of the tube.

4. The combination of claim 2, wherein the sleeve is threadedly disposed on said shank.

5. A combination swaged joined tube and nipple comprising an aluminum tube having an internally threaded bore threadedly receiving therein an externally threaded steel nipple having a flange thereon and slots in the end wall of the tube and in the flange of the nipple; and an aluminum sleeve being disposed on the nipple and between the end wall of the tube and the flange on the nipple and being cold pressed to provide flow of aluminum from said sleeve into the slots in the end wall of the tube and in the flange of the nipple.

6. The combination of claim 5, wherein the slots in the end wall of the tube are provided with side walls aligned with the axis of the bore of the tube.

7. The combination of claim 5, wherein the slots in the flange are provided with side walls aligned with the axis of the bore of the tube.

8. The combination of claim 5, wherein the sleeve is threadedly disposed on said nipple.

9. The combination of claim 5, wherein the aluminum flow is also into the threads of the nipple.

* * * * *